United States Patent [19]

Iyeta

[11] 4,250,380
[45] Feb. 10, 1981

[54] ROTATION ANGLE DETECTOR

[75] Inventor: Motoi Iyeta, Hamamatsu, Japan

[73] Assignee: Nippon Gakki Seizo Kabushiki Kaisha, Japan

[21] Appl. No.: 888,475

[22] Filed: Mar. 20, 1978

[30] Foreign Application Priority Data

Mar. 31, 1977 [JP] Japan .................. 52/38709[U]

[51] Int. Cl.³ .................. G01D 5/34; H02K 39/00
[52] U.S. Cl. .................. 250/231 SE; 250/211 K; 310/111
[58] Field of Search ..... 250/231 SE, 211 K, 231 GY, 250/237 R; 340/347 P; 324/207, 208, 173; 310/168, 111, 169, 170

[56] References Cited

U.S. PATENT DOCUMENTS

| 2,985,872 | 5/1961 | Beltrami | 340/347 P |
| 3,217,308 | 11/1965 | Maxwell, Jr. | 324/173 X |
| 3,358,150 | 12/1967 | Summer | 250/211 K |
| 4,103,155 | 7/1978 | Clark | 250/211 K X |

Primary Examiner—David C. Nelms
Assistant Examiner—Edward P. Westin
Attorney, Agent, or Firm—Ostrolenk, Faber, Gerb & Soffen

[57] ABSTRACT

In the construction of a photoelectric type rotation angle detector for a rotatable or turnable object including a photoelectric transducer, an optical interceptor and a comparator circuit, a cylindrical light interceptive portion extends parallel to the main shaft axis of the interceptor, the optical trace of the transducer extends across the light interceptive portion, and angular deviation of the object from a standard angular position induces corresponding relative rotation between the transducer and the interceptor for generation of a corresponding output from the comparator circuit.

12 Claims, 22 Drawing Figures

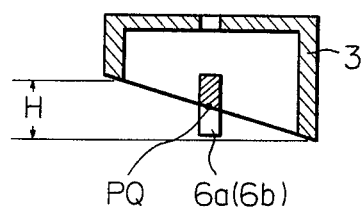
Fig. 4A
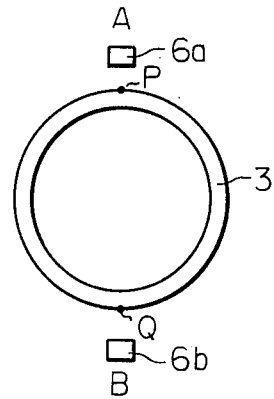
Fig. 4B
Fig. 5A
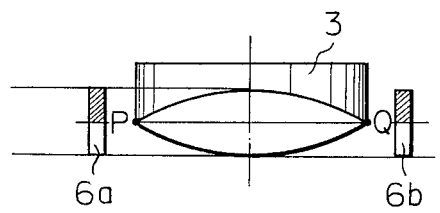
Fig. 5B
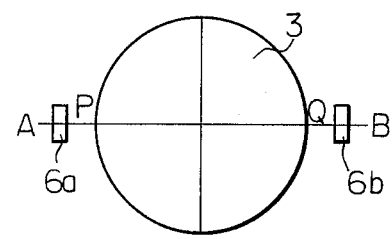

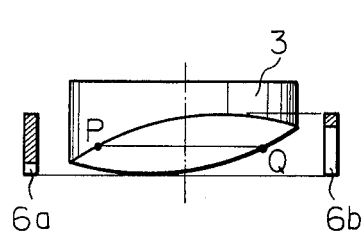
Fig. 9A
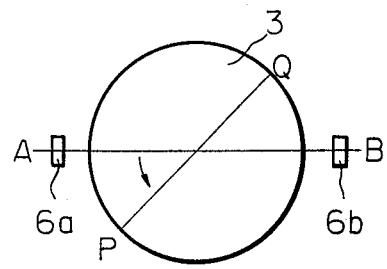
Fig. 9B
Fig. 10
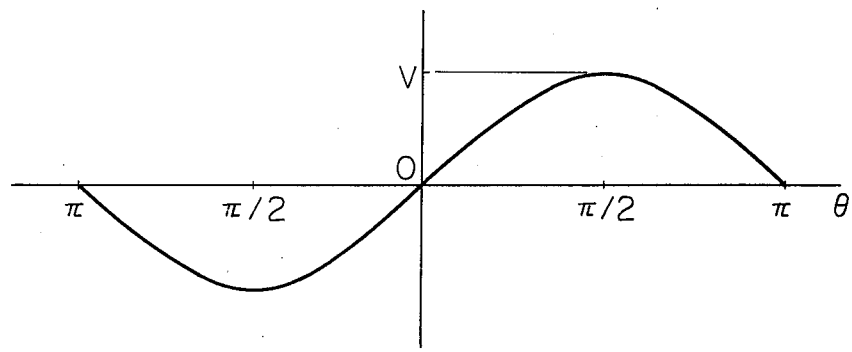
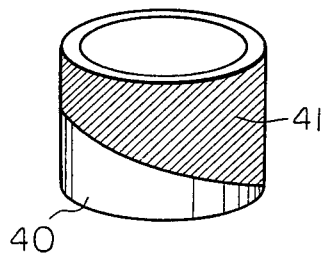
Fig. 11

ROTATION ANGLE DETECTOR

BACKGROUND OF THE INVENTION

The present invention relates to an improved rotation angle detector, and more particularly relates to improvement in the construction of an optical interceptor used in a rotation angle detector made up of a combination of a photoelectric transducer and the optical interceptor and used for a rotatable or turnable object.

In order to carry out successful detection of extremely small angular deviations of a rotatable or turnable object from the standard angular position with high accuracy, it is required that the torque restraining the rotation or turning be negligible, or at least extremely small, and the thermal coefficient of the detection circuit should be extremely small.

Magnetic systems, electrostatic capacity systems and induction systems have been conventionally utilized for rotation angle direction. However, no such conventional system can assure a sufficient degree of accuracy in practice, because of the restraining torque problem.

Photoelectric systems are known to be advantageously suited for rotation angle detection due to their freedom from the restraining torque problem. Such systems are in general made up of a photoelectric transducer and an optical interceptor, the photoelectric transducer including a light source and a light receptive element facing each other and the optical interceptor including a light interceptor interposed between the light source and the light receptive element. The optical transmittancy of the light interceptor varies from position to position on the surface thereof. Angular deviation, i.e. rotation or turning, of the object from its standard angular position induces corresponding relative rotation between the photoelectric transducer and the optical interceptor, and the magnitude of the angular deviation of the object from the standard angular position is represented by the change in the transmissive optical quantity caused by the above-described relative rotation.

In the construction of the conventional photoelectric rotation angle detector, the above-described light interceptor is perpendicular to a supporting shaft it is mounted on, and the optical trace between the light source and the light receptive element runs through the light interceptor. That is, assuming that the above-described supporting shaft extends in the vertical direction, the light interceptor extends in the horizontal direction, and the light source is located spacially on one side, e.g. the upper side, of the light interceptor whereas the light receptive element is located spacially on the other side, e.g. the lower side, of the light interceptor.

In order to assemble a conventional detector of a movable optical interceptor type, it is necessary to first fix the light source and the light receptive element within a casing, secondly interpose the light interceptor between the light source and the light receptive element, thirdly insert the supporting shaft through the light interceptor and finally mount the supporting shaft and the light interceptor in a rotatable fashion within the casing. Thus, assembling the conventional rotation angle detector in general requires highly complicated, highly technical and disadvantageously time-consuming manual operations, which and replacement of the light interceptor and maintenance of the mechanical parts is very inconvenient and difficult.

SUMMARY OF THE INVENTION

It is one object of the present invention to provide a photoelectric type rotation angle detector for a rotatable or turnable object which assures high accuracy.

It is another object of the present invention to provide a photoelectric type rotation angle detector for a rotatable and turnable object which requires only extremely simple manual operations for its assembly.

It is another object of the present invention to provide a photoelectric type rotation angle detector for a rotatable or turnable object replacement and maintenance of the mechanical parts of which is convenient and simple.

In accordance with one preferred embodiment of the present invention, a rotatable angle detector includes: a photoelectric transducer comprising at least a light source and a light receptive element; a main shaft; an optical interceptor including interceptor, either the cylindrical light interceptor or the photoelectric transducer being fixed to the main shaft. Angular deviation of a rotatable or turnable object from the standard angular position induces corresponding relative rotation between the photoelectric transducer and the optical interceptor about the axis of the above-described main shaft. The light interceptor includes a light interceptive portion on the cylindrical wall thereof, the optical interceptive depth of the light interceptive portion varying with angular position on the wall. The light source and the light receptive element face each other in the area of the above-described optical interceptive depth with the cylindrical wall of the light interceptor interposed between them and are located on a common straight line crossing the main shaft axis at a right angle. Furthermore, the light receptive elements are coupled to a comparator circuit that generates an output of a magnitude corresponding to the difference between the optical quantities received by the elements.

The above-described light interceptor is advantageously made of an optically non-transmissive or poorly-transmissive material such as metal. The light interceptor itself may also be made of an optically transmissive material and the above-described light interceptive portion be provided by a light interceptive layer made of an optically non-transmissive or poorly-transmissive material deposited on the cylindrical wall of the light interceptor.

BRIEF DESCRIPTION OF THE DRAWINGS

FIGS. 4A and 4B are explanatory side sectional and plan views, respectively for showing angular relationship between the optical interceptor and the photoelectric transducer of the rotation angle detector shown in FIG. 1;

FIGS. 5A through 9B are explanatory side and plan views for showing operation of the rotation angle detector shown in FIG. 1;

FIG. 10 is a graphical representation of change in the output from the comparator circuit shown in FIG. 3;

FIG. 11 is a perspective view of a modified embodiment of the optical interceptor in accordance with the present invention;

DESCRIPTION OF THE PREFERRED EMBODIMENT

Figure 1:
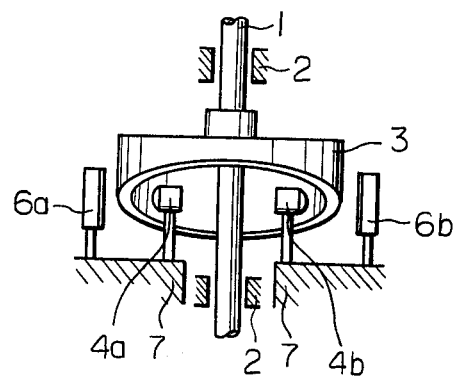
FIG. 1 is a front view, partly in section, of an embodiment of the principal part of the rotation angle detector in accordance with the present invention.
Figure 2:
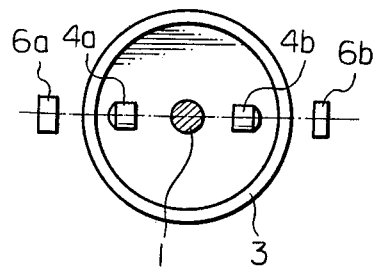
FIG. 2 is an explanatory bottom view of the rotation angle detector shown in FIG. 1.

A principal embodiment of the rotation angle detector in accordance with the present invention is shown in FIGS. 1 and 2, in which a vertical main shaft 1 rotatably supported by a fixed bearing 2 is associated with a cylindrical light interceptor 3 fixed thereto in a coaxial arrangement. This light interceptor 3 is closed at the top for mounting on the main shaft 1 and open at the bottom, while being cut by a flat plane oblique to the axial direction of the main shaft 1. The light interceptor 3 is formed of an optically non-transmissive, or at least an optically poorly-transmissive, material such as metal.

At positions inside the cylindrical wall of the light interceptor 3, a pair of light sources 4a and 4b are provided on a frame 7 of the detector on both sides of the axis of the main shaft 1 (hereinafter referred to simply as "the main shaft axis"). At positions outside the cylindrical wall of the light interceptor 3, a pair of light receptive elements 6a and 6b are provided on the frame 7 in such an arrangement that the light receptive faces of the light receptive elements 6a and 6b face light emitting faces of the associated light sources 4a and 4b, respectively. As is clear from FIG. 2, the light sources 4a and 4b and the light receptive elements 6a and 6b are located on a common straight line which crosses the main shaft axis at a right angle.

Figure 3:
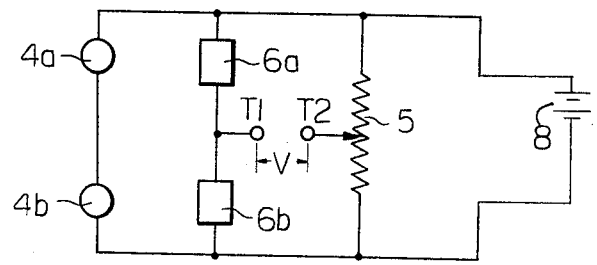
FIG. 3 is a circuit diagram of one embodiment of the comparator circuit used in combination with the construction shown in FIG. 1.

The light receptive element 6a (6b) takes the form of a photoelectric element or a photoelectric cell which generates an electric quantity proportional to the optical quantity received by the element. The light receptive elements 6a and 6b are electrically incorporated into a circuit for comparing the magnitudes of the electric quantities generated by them, such as a bridge circuit shown in FIG. 3.

The bridge circuit comprises an electric source 8, the light receptive elements 6a and 6b and a variable resistor 5. When required, the electric source 8 is used for activating the light sources 4a and 4b, also. The output of the bridge circuit is zero when there is no difference between the electric quantities generated by the light receptive elements 6a and 6b. In other words, the output of the bridge circuit is zero when there is no difference between the optical quantities received by the light receptive elements 6a and 6b, while an output electric voltage V is generated between the terminals T1 and T2 when there is any difference in the electric quantity, i.e. the optical quantity, one terminal T1 being connected to the junction of the light receptive elements 6a and 6b and the other terminal T2 being connected to a point at or near the middle of the variable resistor 5, which point on the resistor 5 is changeable. By properly adjusting the electric potential of the tap point on the resistor 5, operational fluctuation of the light sources 4a, 4b and the light receptive elements 6a, 6b can be fairly compensated, so-called zero-point calibration being effected thereby.

Figure 15:
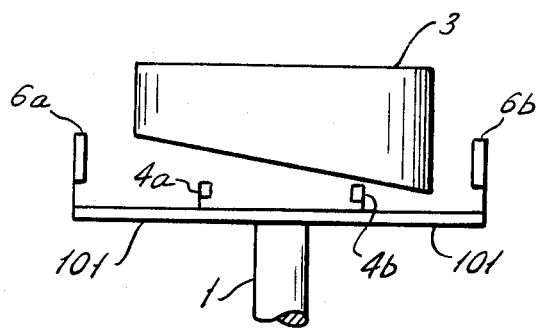
FIG. 15 is a side view in elevation of another embodiment of the present invention.

In the construction of the above-described embodiment, the main shaft 1 and the light interceptor 3 are mounted for rotation and the light sources 4a, 4b and the light receptive elements 6a, 6b are immovably arranged on the frame 7 of the detector. Contrarily, in a modified embodiment, shown in FIG. 15, the light interceptor 3 may be arranged immovably (by means not shown) and the light sources 4a, 4b and the light receptive elements 6a, 6b may be mounted, e.g. by means of arms 101, for revolution about the main shaft axis. In conclusion, it is required that the rotation angle detector comprised of the main shaft 1 and the interceptor 3 and the photoelectric transducer comprised of the light sources 4a, 4b and the light receptive elements 6a, 6b should carry out relative rotation about the main shaft axis of the rotation angle detector.

Furthermore, in the construction of the above-described embodiment, the cylindrical light interceptor 3 is closed at the top for mounting to the main shaft 1 and obliquely open at the bottom for optical interception. Contrarily in a modified embodiment, the cylindrical light interceptor 3 may be obliquely open at the top for the optical interception and closed at the bottom for mounting to the main shaft 1. In conclusion, it is required that the photoelectric transducer should be located within the interceptive zone of the light interceptor 3.

Figure 16:
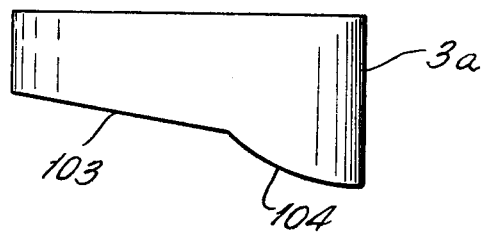
FIG. 16 is a side view in elevation of the light interceptor of yet another embodiment of the present invention.

The open end of the cylindrical interceptor 3 may be defined by either a suitably curved geometric surface or a combination of curved and flat surfaces, as in FIG. 16. In conclusion, it is required that the geometric surface defining the open end of the interceptor 3 should at least include a portion obliquely crossing the main shaft axis.

In the construction of the above-described embodiment, the light sources 4a and 4b are provided inside of the cylindrical wall of the interceptor 3 and the light receptive elements 6a and 6b are provided outside of the cylindrical wall of the interceptor 3. In a modified embodiment, they may be arranged in the opposite fashion also. In other words, the light sources 4a and 4b may be arranged outside the cylindrical wall and the light receptive elements 6a and 6b inside the cylindrical wall. In conclusion, it is required that the light sources and the light receptive elements should be located on a common straight line crossing the main shaft axis at a right angle, both being on different sides of the cylindrical wall of the light interceptor 3. The above-described straight line will hereinafter be referred to simply as "the optical trace".

For the purpose of simplicity in explanation, however, the following description will be made in relation to the construction of the embodiment shown in FIGS. 1 and 2 only.

FIGS. 4A and 4B show the relationship between the above-described optical trace AB and the angular position of the cylindrical light interceptor 3. In the disposition shown in the drawings, the optical interceptive surface areas on the faces of the light receptive elements 6a and 6b by the cylindrical wall of the light interceptor 3 are exactly equal to each other, so that the optical quantities received by the light receptive elements 6a and 6b are equal to each other, the comparator circuit shown in FIG. 3 assumes the balanced state and the output of the comparator circuit is zero.

In FIG. 4A, the optical interceptive surface area on the face of the light receptive element 6a or 6b is shown with hatchings. The points on the cylindrical wall of the interceptor 3 corresponding to the light receptive elements 6a and 6b are marked as P and Q in the illustration, and the straight line connecting the points P and Q will hereinafter be referred to as "the balancing axis". Then, it will be well understood that the output of the comparator circuit is zero when the balancing axis balance PQ coincides with the optical trace AB. The angular position of the light interceptor 3 in which this coincidence between the axis of balance PQ and the optical trace AB occurs will hereinafter be referred to as "the balancing position". In FIG. 4A, the symbol H designates the height of the interceptive zone of the light interceptor 3, and this distance H will hereinafter be referred to as "the optical interceptive depth". In the case of the illustrated example, the balancing axis PQ is located at the middle point H/2 of the optical interceptive depth.

Operation of the above-described rotation angle detector will hereinafter be explained in detail, reference being made to the illustrations given in FIGS. 5A through 9B.

In the disposition shown in FIGS. 5A and 5B, the light interceptor 3 assumes the balancing position. That is, the balancing axis PQ of the light interceptor 3 coincides with the optical trace AB between the light receptive elements 6a and 6b, the hatched optical interceptive surface areas on the faces of the light receptive elements 6a and 6b are equal to each other, the optical quantities received by the elements 6a and 6b are equal to each other and the output of the comparator circuit is zero.

Figure 6A:
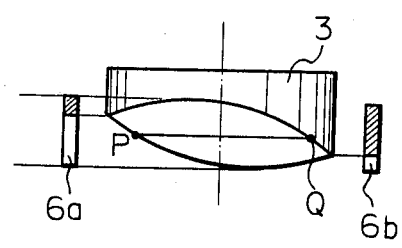
Figure 6B:
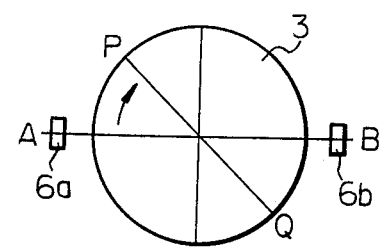

In the disposition shown in FIGS. 6A and 6B, the light interceptor 3 assumes an angular position deviated clockwise from the balancing position in FIGS. 5A and 5B over an angle $\pi/4$. In this disposition, the balancing axis PQ of the light interceptor 3 is deviated clockwise from the optical trace AB between the light receptive elements 6a and 6b over an angle $\pi/4$. As a result of this deviation, the optical interceptive surface area on the face of the one element 6a is rendered smaller than that shown in FIG. 5A whereas the optical interceptive surface area on the face of the other element 6b is rendered larger than that shown in FIG. 5A. Thus, a difference is produced between the optical quantities received by both elements 6a and 6b and an output of a magnitude corresponding to this difference is produced by the comparator circuit.

Figure 7A:
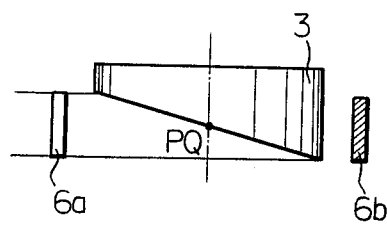
Figure 7B:
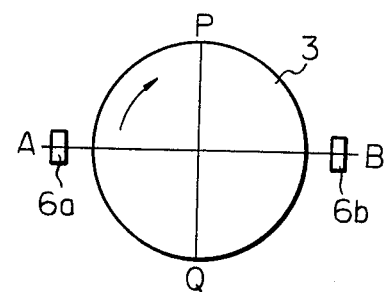

In the disposition shown in FIGS. 7A and 7B, the light interceptor 3 assumes an angular position deviated clockwise from the balancing position in FIGS. 5A and 5B over an angle $\pi/2$. In this disposition, the balancing axis PQ of the light interceptor 3 is deviated clockwise from the optical trace AB between the light receptive elements 6a and 6b over an angle $\pi/2$. As a result of this deviation, the optical interceptive surface area on the face of the one element 6a is rendered zero whereas the optical interceptive surface area on the face of the other element 6b is rendered maximum. In other words, the light from the light source 4b is fully intercepted. As a result of this deviation, the difference in the optical quantity assumes the maximum value in order to render the output from the comparator circuit maximum.

Figure 8A:
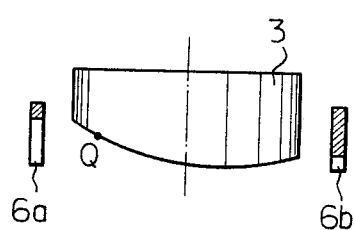
Figure 8B:
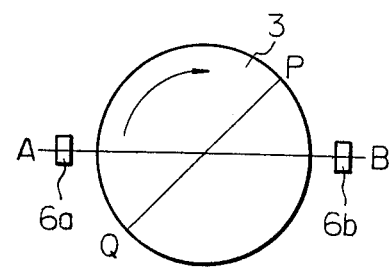

In the disposition shown in FIGS. 8A and 8B, the light interceptor 3 assumes an angular position deviated clockwise from the balancing position in FIGS. 5A and 5B over an angle $\frac{3}{4}\pi$. In this disposition, the balancing axis PQ of the light interceptor 3 is deviated clockwise from the optical trace AB between the light receptive elements 6a and 6b over an angle $\frac{3}{4}\pi$. Here, the optical interceptive surface areas on the faces of the elements 6a and 6b are same with those in the disposition shown in FIGS. 6A and 6B. Consequently, the output from the comparator circuit is equal to that in the disposition shown in FIGS. 6A and 6B and, naturally, smaller than the maximum value obtained in the disposition shown in FIGS. 7A and 7B.

In the disposition shown in FIGS. 9A and 9B, the light interceptor 3 assumes an angular position deviated counterclockwise from the balancing position in FIGS. 5A and 5B over an angle $\pi/4$. In this disposition, the balancing axis PQ of the light interceptor 3 is deviated counterclockwise from the optical trace AB between the light receptive elements 6a and 6b. As a result of this, the mode of optical interception is exactly opposite to that in the disposition shown in FIGS. 6A and 6B. That is, the optical interceptive surface area on the face of the element 6a in FIG. 9A is equal to that on the face of the element 6b in FIG. 6A whereas the optical interceptive surface area on the face of the element 6b in FIG. 9A is equal to that on the face of the element 6a in FIG. 6A.

The above-described change in the output from the comparator circuit is given in FIG. 10 in a graphical representation, in which the output voltage V is taken as the ordinate and the angular deviation $\theta$ in radians is taken as the abscissa. The change takes the form of a sine curve and the maximum value of the output from the comparator circuit is proportional to the optical interceptive depth H by the light interceptor 3. The change in the output may take various forms other than the sine curve by changing the nature of the geometric surface defining the open end of the light interceptor 3 and the position of the balancing axis PQ of the light interceptor 3.

In the case of the above-described embodiment, the light interceptor 3 is given in the form of a cylindrical body open at one end and formed of an optically poorly-transmissive, or at least less-transmissive, material such as metal. A variant of the light interceptor is shown in FIG. 11, in which the light interceptor takes the form of a cylindrical body 40 made of an optically transmissive material. The cylindrical body 40 is provided with an optically poorly-transmissive layer 41 formed on the cylindrical wall thereof by suitable printing or steam coating above the portion corresponding to the above-described optical interceptive depth.

An additional embodiment of the light interceptor is shown in FIG. 16. In the version 3a, the lower edge of the interceptor, as seen from the side, is partly straight 103 and partly curved 104. It is also possible to use a light interceptor the entire lower edge of which appears curved in a side view.

The above-described principal construction of the rotation angle detector in accordance with the present invention is suited for a wide variety of applications.

Figure 12:
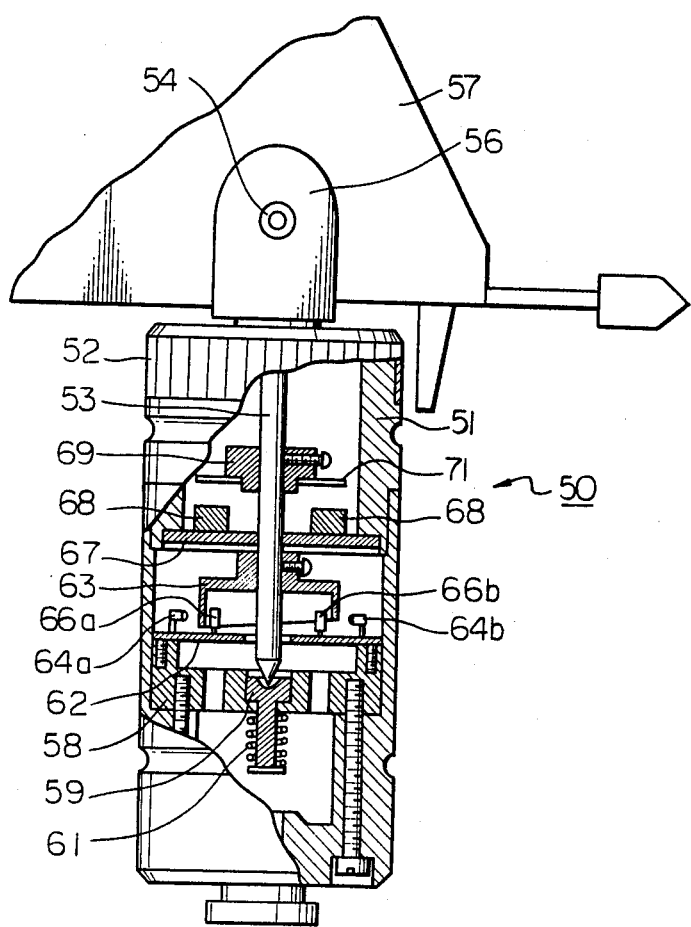
FIG. 12 is a side view, partly in section, of an embodiment of a wind heading finder incorporating the rotation angle detector in accordance with the present invention.

One example of the application is shown in FIG. 12, in which the rotation angle detector in accordance with the present invention is incorporated into wind heading finder or wind direction indicator 50.

A main shaft 53 is coaxially and rotatably encased within a cylindrical main casing 51 associated with a scale board 52 mounted thereto. The top portion of the main shaft 53 extends outward beyond the ceiling of the main casing 51 and fixedly carries an wind vane 57 via a pin 54 and a top cover 56. The wind vane 57 bears wind pressure and turns together with the main shaft 53 about the main shaft axis in order to assume an angular position meeting the wind heading. The bottom end of the main shaft 53 is provided with a needle point.

At a position within the main casing 51 near the above-described needle point of the main shaft, there is provided a horizontal bulkhead 58 fixed to the main casing 51. A pivot bearing 59 having a conical recess in the top face thereof is movably accommodated in the central portion of the bulkhead 58 in order to receive the bottom needle point of the main shaft 53. The degree of convergence of the conical recess of the pivot bearing 59 should preferably be looser than that of the needle point of the main shaft 51. A compression spring 61 is inserted between the bottom end bulge of the pivot bearing 59 and the lower face of the bulkhead 58 in order to urge the conical recess of the pivot bearing 59 into resilient pressure contact with the needle point of the main shaft 53. Since the main shaft 53 and the pivot bearing 59 are related to each other via a point contact, the above-described pressure contact does not substantially hinder free rotation of the main shaft 53 to be caused by wind pressure acting on the wind vane 57.

At a position above the bulkhead 58 within the main casing 51, a base plate 62 is horizontally fixed to the main casing 51 and a cylindrical light interceptor 63 is coaxially fixed to the main shaft 53 with its open end spacially confronting the top face of the base plate 62. This light interceptor 63 is of a type substantially similar to the one shown in FIGS. 1 and 2. Substantially similar to the arrangement shown in FIGS. 1 and 2, a pair of light receptive elements 66a, 66b and a pair of light sources 64a, 64b are arranged on the base plate 62 on different sides of the cylindrical wall of the light interceptor 63 and these components are all electrically coupled, via wires not shown, to a common comparator circuit such as the one shown in FIG. 3.

At a position above the light interceptor 63, a horizontal blocking plate 67 is internally fixed to the main casing 51 and the main shaft 53 extends through this blocking plate 67. One or more magnets 68 are fixedly mounted to the top face of the blocking plate 67. At a position somewhat above the magnets 68, an iron disc 71 is centrally fixed to the main shaft 53 via a flange 69. Thus, the magnetic attraction between the magnets 68 on the blocking plate 67 and the iron disc 71 on the main shaft 53 urges the main shaft 53 downwardly in order to effectively block accidental jumping of the main shaft 53 during actual use of the wind heading finder 50.

With the above-described construction of the wind heading finder 50, the angular position assumed by the light interceptor 63 when no wind blows is fixed as the above-described balancing position. As the wind starts to blow, the wind pressure acting on the wind vane 57 forces the latter to turn about the main shaft axis until the angular position of the wind vane 57 meets the wind heading and no effective wind pressure substantially acts on the wind vane 57. This turning of the wind vane 57 naturally causes a corresponding rotation of the light interceptor 63 via the main shaft 53 and the comparator circuit generates an output of a magnitude corresponding to the rotation angle of the light interceptor 63. This electric output may be either directly indicated in an analogous fashion or passed to an A—D converter for digital indication. When required, the output from the comparator may be passed to an automatic steering system for boats or cruisers as a control signal.

Figure 13:
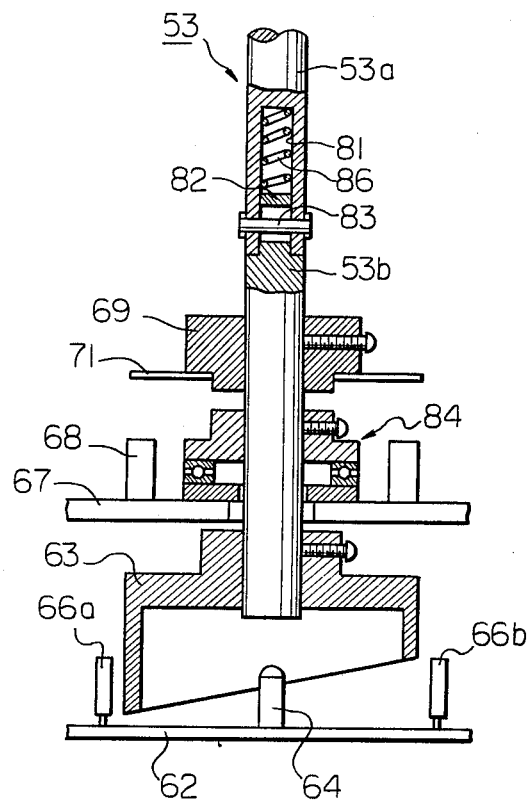
FIGS. 13 and 14 are side views, partly in section, of variants of the wind heading finder shown in FIG. 12.

FIG. 13 depicts a modification of the wind heading finder shown in FIG. 12. At a position somewhat above the flange 69 for the iron disc 71, the main shaft 53 is divided into an upper main shaft 53a and a lower main shaft 53b in such an arrangement that a top projection 82 of the lower shaft 53b is received within a bottom hollow 81 of the upper shaft 53a. A pin 83 extends diametrically through radial holes formed in the lower end of the upper shaft 53a and a diametral idle hole formed in the top projection 82 of the lower shaft 53b in order to couple the shafts 53a and 53b to each other. A compression spring 86 is encased within the bottom hollow 81 of the upper shaft 53a. The lower shaft 53b is coupled to the blocking plate 67 via a ball bearing 84 and terminates at a position somewhat below the ceiling of the light interceptor 63. A single light source 64 is arranged just below the bottom termination of the lower shaft 53b on the base plate 62.

In the case of the construction shown in FIG. 12, the main shaft 53 is resiliently supported by the magnetic attraction afforded by the magnets 68 and the repulsion by the spring 61 in order to be blocked against jumping accidentally caused by violent rolling of a boat, on which the wind heading finder is mounted. For a similar purpose, the present embodiment employs a mechanism in which the lower shaft 53b is held by the blocking plate 67 via the ball bearing 84 and the upper shaft 53a is resiliently upheld relative to the lower shaft 53b via the interposed spring 86. Thanks to this modification in the resilient holding of the main shaft 53, it is no longer necessary to extend the main shaft 53 below the level of the base plate 62, thereby assuring a central space on the base plate 62 for mounting of the single light source 64. In any case, assembling of the entire construction can be greatly simplified since the photoelectric system is wholly arranged on the base plate 62.

Figure 14:
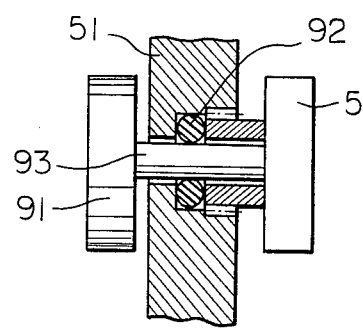

A variant of the above-described wind heading finder is shown in FIG. 14, in which the variable resistor 5 (see FIG. 3) is disposed to a proper position on the inside cylindrical wall surface of the main casing 51 via a watertight sealing ring 92 and a screw engagement. The variable resistor 5 is coupled to an outside adjuster knob 91 via a shaft 93 radially extending through the cylindrical wall of the main casing 51. This construction enables zero-point calibration from outside of the wind heading finder with effective water-proof. Differently from this, the variable resistor 5 may be mounted to the bottom face of the base plate 62 in FIG. 12 with the adjuster knob 91 being arranged outside the bottom wall of the main casing 51.

Aside from the applications shown in FIGS. 12 and 13, the rotation angle detector in accordance with the present invention is advantageously applicable to a linear tracking arm mechanism for record players also. It is generally required with record players that the tone arm should always keep true tangency with respect to the record groove. When incorporated into the linear tracking arm mechanism, the rotation angle detector in accordance with the present invention successfully detects even extremely small angular deviation of the tone arm from true tangency and the associated comparator circuit generates an electric output representative of the above-described angular deviation. The output from the comparator circuit is passed to a reversible motor used for driving a tone arm carriage for movement along a prescribed course and the carriage is driven for movement in order to compensate the angular deviation of the tone arm from true tangency with respect to the record groove.

The rotation angle detector in accordance with the present invention is usable for a function waveform generator for generating desired output waveform such as the one shown in FIG. 10. For this purpose, the open end of the light interceptor is defined by a geometric surface obliquely crossing the main shaft axis and the main shaft carrying the light interceptor is rotated at a selected constant speed.

In the case of the rotation angle detector in accordance with the present invention, the value of $(dV/d\theta)$ is extremely large in the vicinity of the balancing position of the light interceptor, i.e. the position at which the rotation angle $\theta$ is equal to zero. Therefore, the rotation angle detector in accordance with the present invention can detect with enhanced accuracy minute changes of the rotation angle $\theta$ in the vicinity of the balancing position. In the case of the waveform output shown in FIG. 10, a simple flat plane obliquely crossing the main shaft axis is used for defining the open end of the light interceptor. However, by properly designing the shape of the geometric surface, it is possible to further enlarge the value of $(dV/d\theta)$ in the vicinity of the balancing position in order to obtain a further enhanced accuracy in detection of the extremely small change in the rotation angle in the vicinity of the balancing position.

In the case of the present invention, the cylindrical wall of light interceptor extends in parallel to the main shaft axis and this parallel arrangement assures very simple assembly of the whole apparatus. For example, with the construction shown in FIG. 1, assembly is completed by first fixing the photoelectric transducer elements 4a, 4b, 6a and 6b within the main casing, secondly fixing the light interceptor 3 to the main shaft 1 outside the main casing and, finally, incorporating the optical interceptor into the main casing.

I claim:

1. An improved rotation angle detector for detecting the rotational angular deviation of an object from a standard angular position about a selected axis, comprising:

an optical interceptor comprising a light-interceptive surface coaxial with said axis, the optical interceptive depth of said light-interceptive surface varying from position to position about said axis;

a photoelectric transducer comprising at least two photoelement systems, including a light source as one of said two photoelement systems and first and second light-receptive elements as the other of said two photoelement systems, said first and second light-receptive elements being angularly spaced apart about said axis, said optical interceptive depth varying with respect to the positions of said light-receptive elements such that upon relative rotation of said light-interceptive surface with respect to said light-receptive elements about said axis, the amount of light that passes from said light source to said light-receptive elements varies;

a main shaft co-rotatably coupled to said object, said photoelectric transducer being fixedly coupled to said main shaft;

means for rotating said optical interceptor and said photoelectric transducer relative to each other about said axis; and comparator circuit means electrically coupled to and responsive to the outputs of said light-receptive elements for generating an output representative of the amount of light passing from said light source past said light-interceptive surface to said light-receptive elements which corresponds to said angular displacement of said photoelectric transducer and said surface relative to each other.

2. An improved roatation angle detector as claimed in claim 1 in which said light-interceptive surface comprises a cylindrical wall having an open end for receiving at least one of said photoelement systems during at least part of said relative rotation of said optical interceptor and said photoelectric transducer.

3. An improved rotation angle detector as claimed in claim 2 in which said open end of said light interceptor is defined by an imaginary surface at least a portion of which obliquely crosses said axis.

4. An improved rotation angle detector as claimed in claim 3 in which said imaginary surface is in a plane.

5. An improved rotation angle detector as claimed in claim 3 in which said imaginary surface is curved.

6. An improved rotation angle detector as claimed in claim 3 in which said imaginary surface has a planar portion and a curved portion.

7. An improved rotation angle detector as claimed in claim 2 in which said light interceptor is made of an optically non-transmissive material.

8. An improved rotation angle detector as claimed in claim 2 in which said light interceptor is made of an optically transmissive material and said light interceptive surface takes the form of an optically non-transmissive layer deposited on said cylindrical wall.

9. An improved rotation angle detector as claimed in claim 2 in which said light interceptor is made of an optically transmissive material and said light interceptive surface takes the form of a section on said cylindrical wall which is optically less-transmissive than said optically transmissive material.

10. An improved rotation angle detector as claimed in claim 1 wherein said light receptive elements are spaced apart 180°.

11. An improved rotation angle detector as claimed in claim 3 wherein said light-interceptive surface is cylindrical.

12. An improved rotation angle detector as claimed in claim 9, wherein said section on said cylindrical wall comprises a layer of material deposited on said cylindrical wall.

* * * * *